United States Patent [19]

Norman

[11] Patent Number: 5,284,174
[45] Date of Patent: Feb. 8, 1994

[54] SYSTEM AND METHOD FOR PRODUCING AND MAINTAINING PREDETERMINED PROPORTIONATE MIXTURES OF FLUIDS

[75] Inventor: Edward C. Norman, Chester Springs, Pa.

[73] Assignee: Chubb National Foam, Inc., Lionville, Pa.

[21] Appl. No.: 931,933

[22] Filed: Aug. 18, 1992

[51] Int. Cl.$^5$ .............................................. F16K 31/00
[52] U.S. Cl. .......................................... 137/5; 137/93
[58] Field of Search ..................................... 137/5, 93

[56] References Cited

U.S. PATENT DOCUMENTS

| | | |
|---|---|---|
| 3,592,269 | 7/1971 | Stults . |
| 3,709,302 | 1/1973 | Stults . |
| 3,739,795 | 6/1973 | Hyde et al. ............................ 137/5 |
| 3,750,754 | 8/1973 | Stults . |
| 3,900,043 | 8/1975 | Bowen et al. . |
| 3,977,474 | 8/1976 | Boegli . |
| 4,031,912 | 6/1977 | Lu et al. .............................. 137/5 |
| 4,064,891 | 12/1977 | Eberhardt . |
| 4,246,969 | 1/1981 | McLoughlin et al. . |
| 4,278,132 | 7/1981 | Hostetter . |
| 4,324,294 | 4/1982 | McLoughlin et al. . |
| 4,417,601 | 11/1983 | Bennett . |
| 4,439,329 | 3/1984 | Kleiner et al. . |
| 4,460,480 | 7/1984 | Kleiner et al. . |
| 4,474,680 | 10/1984 | Kroll . |
| 4,531,588 | 7/1985 | Brünsicke . |
| 4,633,895 | 1/1987 | Eberhardt . |
| 4,805,700 | 2/1989 | Hoover . |
| 4,828,038 | 5/1989 | Williams . |
| 4,899,825 | 2/1990 | Bosoni et al. . |
| 5,009,244 | 4/1991 | Grindley et al. . |

FOREIGN PATENT DOCUMENTS 1526741  9/1978  United Kingdom ............... 137/5

OTHER PUBLICATIONS

Operating instructions for the Feecon Corp. "Feecon Around-the-Pump-Proportioner Model A.P.," dated Jan. 24, 1986.
National Foam publication entitled "Foam Concentrate Proportioning," pp. 3–3 through 3–8, earliest page dated Aug. 1985.
Fireout Systems, Ltd. promotional brochure on "The Flow Based Proportioning System," dated 1985.
Fire Research Corp. promotional brochure for "Electronic Foam Systems Model: EF50," undated.
Hypro Corporation promotional brochure for "Form-Flo System 1000," undated.
Hypro Corporation promotional brochure for "Form-Pro System 2000," undated.
Hypro Corporation promotional brochure for "Form-Pro System 2000EZ," undated.
Hypro Corporation promotional brochure for "Foam-Pro System 3000," undated.
Hypro Corporation "The FoamProportioner" newsletter, vol. 91, Issue 1, Mar. 1991.

*Primary Examiner*—John C. Fox
*Attorney, Agent, or Firm*—Samuels, Gauthier & Stevens

[57] ABSTRACT

A system and method for producing and maintaining a predetermined proportionate mixture of two fluids, such as water and foam concentrate, in accordance with conductivity measurements of the fluids. A set point is established which is representative of the conductivity of the predetermined proportionate mixture. The conductivity of the mixture is measured and compared with the set point by conductivity probes and a microprocessor. A control valve is continuously adjusted to maintain the predetermined proportionate mixture in response to control signals from the microprocessor in accordance with the comparisons of the conductivity values.

16 Claims, 2 Drawing Sheets

SYSTEM AND METHOD FOR PRODUCING AND MAINTAINING PREDETERMINED PROPORTIONATE MIXTURES OF FLUIDS

BACKGROUND OF THE INVENTION

The invention relates to the production and maintenance of predetermined proportionate mixtures of fluids, and more specifically to a system and method for producing and maintaining a proportionately constant mixture of water and foam concentrate, typically for use in firefighting apparatus.

Direct injection foam concentrate proportioning systems offer many advantages over the currently used balanced pressure, in-line eductor and around-the-pump systems. Balanced pressure systems require ratio controllers which have limits as to flow range, and which also typically produce an undesirable pressure loss. In-line eductor systems are limited as to flow range and back pressure tolerance, and typically cause a pressure loss of 30-40% of inlet pressure. Due to the fact that eductors will not function if back pressure exceeds 65-70% of inlet pressure, these systems must be carefully matched to the downstream system so that excessive back pressure will not occur. Their proportioning accuracy is poor if the inlet pressure varies significantly from the design value. Around-the-pump systems require readjustments of the proportioning valve each time the system flow changes, and will not work if pump inlet pressure exceeds the allowable back pressure of the high volume jet pump used in the system. The around-the-pump proportioners cannot be used in systems where foam solution is desired at some system discharge points and water at others. However, they have considerable utility, especially in aircraft crash rescue vehicles and municipal pumpers.

Conventional direct injection systems make use of paddlewheel-type flow meters to measure water and foam concentrate flow rates. The foam concentrate flow rate is then adjusted either manually or automatically to the desired percentage of the water flow rate. Paddlewheel flow meters are affected by the viscosity of the liquid being measured, thus making it necessary to recalibrate them for foam concentrates of differing viscosities, and making them impossible to use with foam concentrates which have non-Newtonian rheologies. Exemplary systems of this type are described in U.S. Pat. Nos. 4,324,294 and 4,246,969, both issued to McLoughlin et al., relating to chemical injection systems.

SUMMARY OF THE INVENTION

It is an object of the present invention to provide a proportioning system which is not dependent on flow rate or pressure measurements for producing proportionately constant mixtures of fluids.

It is a further object of the present invention to provide a system which produces a proportionately constant mixture of first and second fluids in accordance with the electrochemical properties of the fluids being mixed.

It is another object of the present invention to provide a direct injection proportioning system which performs automatic injection of foam concentrates into a water stream to produce a preselected solution percentage based on the conductivity properties of the water and foam concentrates.

In accordance with these and other objects, the present invention provides a system and method for producing a proportionally constant mixture of first and second fluids. The system includes a first supply of the first fluid and a second supply of the second fluid. A predetermined mixture ratio of the first and second fluids is initially selected and its conductivity characteristics determined for use as a set point. The conductivity characteristics of the first and second fluids are also measured. The first and second fluids are then mixed in accordance with their measured conductivity characteristics as compared to the set point so as to produce the desired proportionately constant mixture. The proportionally constant mixtures of the first and second fluids is then discharged.

Conductivity proportioning is not dependent on flow rate or pressure as is inherent with conventional ratio controllers. Conductivity will solve the problem of accurate proportioning over a wide range of flows. Currently available equipment operates with a turndown range of approximately 8:1. Thus, the maximum flow of the device is about eight times greater than the minimum flow. For example, an exemplary flow range through a three-inch ratio controller is 150 GPM to 1200 GPM. Many systems need to operate over a wider range, such as 30 GPM to 1200 GPM or higher. The prior art necessitates a compromise in proportioning accuracy. Some systems will proportion less-than-desired percentages (lean) at low flows (less than standard flow range), while others will operate at greater than the desired percentage (rich).

DETAILED DESCRIPTION OF THE ILLUSTRATED EMBODIMENTS

Figure 1:
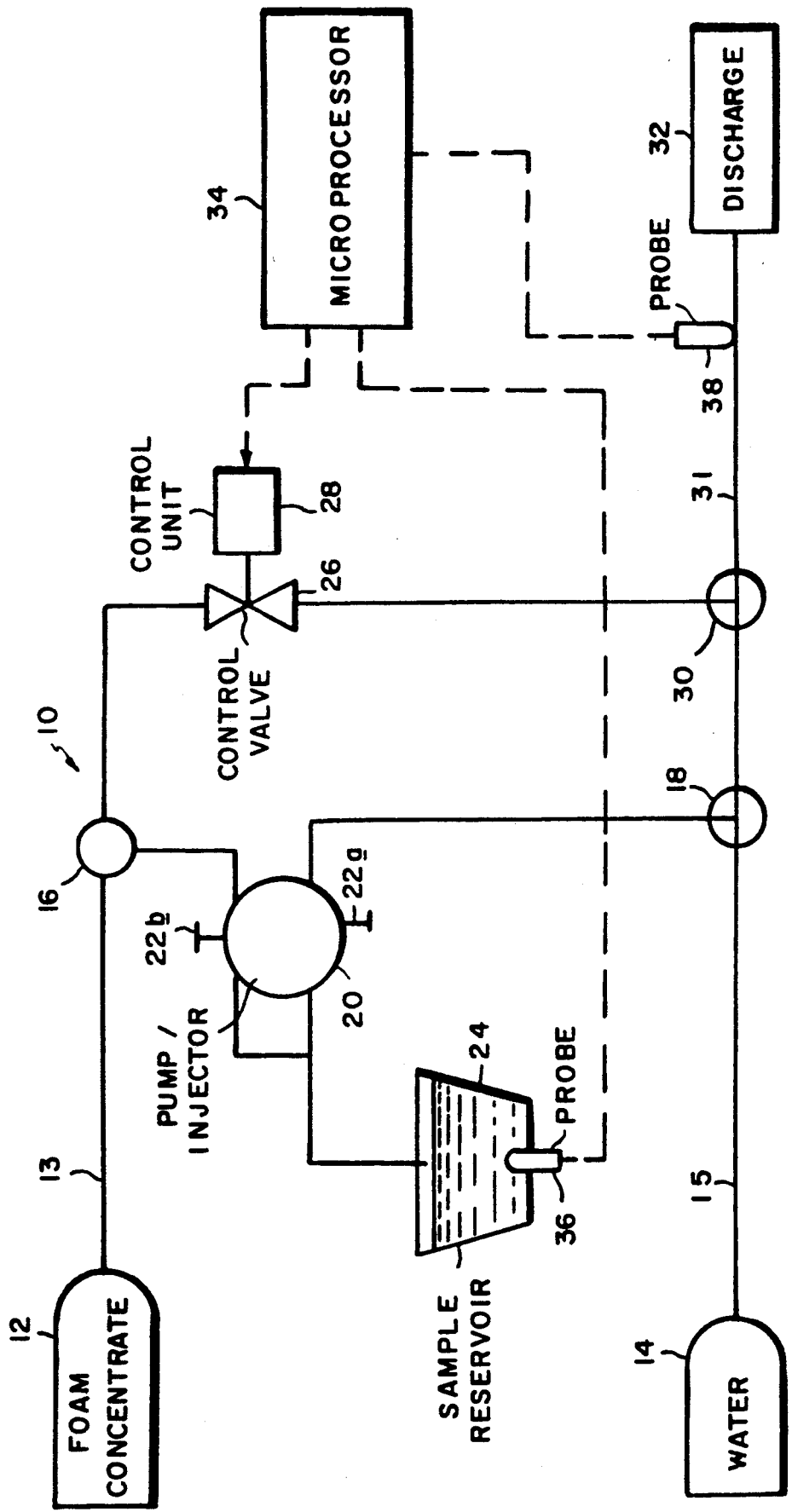
FIG. 1 shows a schematic block diagram of the proportionally constant mixture system in accordance with the present invention.

With reference now to FIG. 1, a proportioning system 10 in accordance with the present invention is shown. The system includes a first supply 12 of a first fluid and a second supply 14 of a second fluid. For purposes of illustration, the first and second fluids may be foam concentrate and water, respectively. The foam concentrate and water are driven by conventional means, e.g., a pump (not shown), along flow paths 13 and 15, respectively. A control valve 26 is adjustable to provide a predetermined amount of foam concentrate to be injected into the flow of water so as to achieve a desired solution. The valve 26 is automatically adjusted by a valve control unit 28 which receives control signals from a microprocessor 34. The control of valve 26 may be operated electromechanically, electropneumatically, or electrohydraulically. The desired amount of foam concentrate from supply 1 is combined with the flow of water from supply 14 by a flow combining unit 30. The mixed solution of foam concentrate and water is thereafter released from the system by a discharge device 32.

According to the present invention, the manner in which the microprocessor 34 adjusts the control mixing valve 26 depends on measurements of the specific electrochemical properties of the fluids to be mixed, in this example water and foam concentrates. Since both water and foam concentrates are electrolytes, their chemical make-up is such that they have the ability to conduct an electric current, thus the fluids are conductive. It is therefore possible to measure the percentage concentration of foam concentrate in water by measuring the conductivity of the foam solution and comparing it to desired predetermined conductivity values. Thereafter, the mixture ratio is adjusted in accordance with the compared values.

As shown in FIG. 1, T-connections 16 and 18 are provided along the flow paths 13 and 15, respectively, for diverting a partial flow of the fluids to individually adjustable injectors 22a and 22b of a low capacity duplex metering pump 20. The metering pump 20 preferably has a maximum pumping capacity of about two gallons per hour for each injector. The adjustable injectors 22a and 22b are set to desired mixture ratios by an operator, for example 97 parts water and 3 parts foam or 94 parts water and 6 parts foam, etc. The metering pump draws the desired ratios of water and foam concentrate from the flow lines 13 and 15 and mixes them together. The mixed solution of foam concentrate and water is discharged into a sample reservoir 24. A conductivity probe 36 is installed within the sample reservoir 24 for measuring the conductivity of the sample mixtures. The probe 36 thereafter provides a signal to the microprocessor 34 indicative of the conductivity measurement. It will be appreciated that the reservoir 24 may be provided with an overflow valve (not shown) or a discharge path (not shown) to the discharge device 32 so that continuous sampling of the water and foam concentrate may occur.

Conductivity measurement signals from a conductivity probe 38 located in the foam solution discharge line 31 which makes similar conductivity measurements of the solution being discharged at the discharge device 32, are simultaneously sent to the microprocessor 34. The microprocessor operates to compare the conductivity measurements of the sample mixture in the sample reservoir 24 and the mixture of foam concentrate and water which is actually being discharged by the system. In response to the results of this comparison, the microprocessor thereafter generates a control signal to the control unit 28 to make appropriate adjustments of the control mixing valve 26 so that the differences between the compared measurements of the sample solution in the sample reservoir 24 and the solution being discharged at discharge 32 are at least minimized and preferably substantially eliminated. It will be appreciated by those of skill in the art that the microprocessor 34 may be programmed so that the required match of measured conductivity values would be within a range, rather than an exact number, so as to prevent the control mixing valve from continuously "hunting". This range may be adjustable to any degree of accuracy desired.

Since the metering pump 20 operates to continuously sample the foam concentrate and water being mixed, the system 10 is capable of making instantaneous adjustments to compensate for changes in the water source or type of foam concentrate being used. This is most advantageous in situations where the supply of foam concentrate may be refilled during operating with a foam concentrate of a different brand or type, thus having differing conductivity characteristics than that of the foam concentrate previously used in the system. The same is true of the water supply in that different water supplies may provide water having different conductivity characteristics.

It will be appreciated by those of skill in the art that modifications of the system 10 as shown in FIG. 1 could be made so that the system has multiple injection points for the foam concentrate to be mixed with the flow of water, and multiple foam solution discharge devices. The system 10 may be modified such that each of the multiple injection points includes a dedicated control mixing valve and discharge conductivity probe. Conventional microprocessor designs and programs would permit the operator to select foam solution at certain discharge points and water at others. Furthermore, the use of multiple sample reservoirs may be utilized so that each of the multiple discharge devices could discharge foam solutions having different mixture ratios. In addition, the microprocessor 34 may be programmed to provide a display of the present mixture ratio so that the operator may manually adjust one or more of the control mixing valves.

Figure 2:
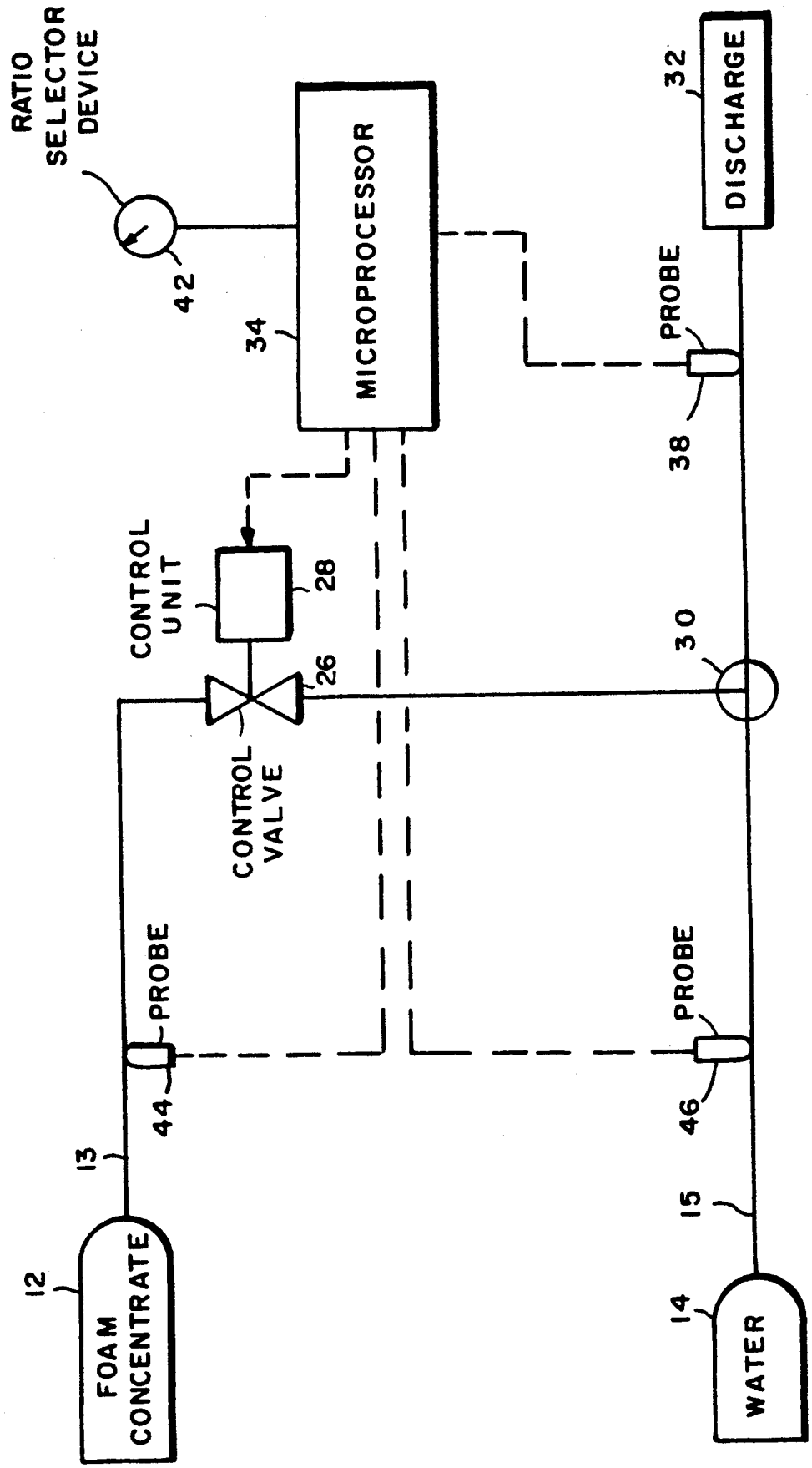
FIG. 2 shows a schematic block diagram of an alternate embodiment of the proportionately constant mixture system of the present invention.

With reference now to FIG. 2, an alternate embodiment of the present invention is shown as a proportionately constant mixing system 40. Similar to the system 10 of FIG. 1, the system 40 includes a supply of foam concentrate 12 which is connected by flow path 13 to a control mixing valve 26. The control mixing valve provides a predetermined amount of foam concentrate as determined by microprocessor 34 which controls the valve control unit 28 for mixing with a flow of water from supply 14 at the flow combiner unit 30. The foam concentrate and water solution is discharged from the system by the discharge device 32.

A ratio selector device 42 is set for a desired proportioning percentage of foam concentrate and water for storage by the microprocessor 34. A conductivity probe 44 is disposed along the flow line 13 from the foam concentrate supply 12 for measuring the conductivity value of the foam concentrate and providing a signal indicative of same to the microprocessor. Similarly, a conductivity probe 46 is provided along the water flow line 15 for measuring the conductivity value of the water and providing the microprocessor with this value. The microprocessor 34 operates to compare the measured conductivity values of the water and foam concentrate with the desired mix ratio percentage set at the selector device 42. A determination is then made by the microprocessor of the conductivity value required for the system 40 to yield a solution with the correct proportioning ratio. The conductivity probe 38 provides the microprocessor with signals indicative of conductivity measurements of the discharged solution. The microprocessor 34 thereafter compares the previously determined conductivity value which is desired with the actual conductivity value being discharged and provides a control signal to the control unit 28 for adjusting the control mixing valve 26 in order to minimize the differences between the compared values, thus providing a solution with the correct proportioning ratio.

What is claimed is:

1. A system for combining a plurality of fluids flowing respectively along separate paths into a predetermined proportionate mixture flowing along a common path, said system comprising:

means for continuously sampling said fluids flowing along said paths and for providing a sample mixture thereof at a ratio corresponding to said predetermined proportionate mixture;

first measuring means for measuring the conductivity characteristics of said sample mixture;

second measuring means for measuring the conductivity characteristics of said predetermined proportionate mixture flowing along said common path;

means for comparing the conductivity of the mixture flowing along said common path with the conductivity of said sample mixture, and for generating a control signal representative of any difference therebetween; and means responsive to said control signal for adjusting the proportionate mixture flowing along said common path in order to minimize said difference.

2. The system of claim 1, wherein said sample mixing means comprises a low capacity duplex metering pump and adjustable injectors associated with each of said fluids.

3. The system of claim 1, wherein said first and second measuring means each comprise at least one conductivity probe.

4. The system of claim 1, wherein said adjusting means comprises an adjustable control valve.

5. The system of claim 1, wherein said comparing means comprises a microprocessor.

6. The system of claim 1, wherein said fluids comprise water and foam concentrate.

7. A method of combining a plurality of fluids flowing respectively along separate paths into a predetermined proportionate mixture flowing along a common path, said method comprising the steps of:

continuously sampling the fluids flowing along said paths and producing a sample mixture thereof at a ratio corresponding to said predetermined proportionate mixture;

measuring the conductivity characteristics of said sample mixture;

measuring the conductivity characteristics of said predetermined proportionate mixture flowing along said common path;

comparing the conductivity of the mixture flowing along said common path with the conductivity of said sample mixture, and generating a control signal representative of any difference therebetween; and adjusting the proportionate mixture of said fluids flowing along said common path in order to minimize said difference in response to said control signal.

8. A system for maintaining a predetermined proportionate mixture of first and second fluids, said system comprising:

first mixing means for mixing said first and second fluids to continuously produce a proportionate discharge mixture;

second mixing means for mixing said first and second fluids to produce a sample mixture at a ratio corresponding to said predetermined proportionate mixture;

means for measuring and comparing the conductivity of the discharge mixture with the conductivity of said sample mixture, and for generating a control signal representative of any difference therebetween; and means responsive to said control signal for adjusting said first mixing means in order to minimize the difference between the measured conductivities of said sample mixture and said discharge mixture.

9. The system of claim 8 further comprising first means for measuring the conductivity characteristics of said sample mixture of said first and second fluids.

10. The system of claim 9 further comprising second means for measuring the conductivity characteristics of said discharge mixture.

11. The system of claim 10, wherein said first and second measuring means comprise at least one conductivity probe.

12. The system of claim 8, wherein said second mixing means comprises a low capacity duplex metering pump and adjustable injectors associated with each of said fluids.

13. The system of claim 8, wherein said adjusting means comprises an adjustable control valve.

14. The system of claim 8, wherein said measuring and comparing means comprises a microprocessor.

15. The system of claim 8, wherein said first and second fluids comprise water and foam concentrate.

16. A method of maintaining a predetermined proportionate mixture of first and second fluids, said method comprising the steps of:

mixing said first and second fluids to produce a proportionate discharge mixture;

mixing said first and second fluids to produce a sample mixture at a ratio corresponding to a predetermined proportionate mixture;

measuring and comparing the conductivity of the discharge mixture with the conductivity of said sample mixture, and generating a control signal representative of any difference therebetween; and adjusting, in response to said control signal, said first mixing means in order to minimize the difference between the measured conductivities of said sample mixture and said discharge mixture.

* * * * *